(12) United States Patent
Suzuki et al.

(10) Patent No.: US 7,267,495 B2
(45) Date of Patent: Sep. 11, 2007

(54) CONNECTION METHOD AND CONNECTING STRUCTURE FOR PHOTONIC CRYSTAL FIBER

(75) Inventors: Ryuji Suzuki, Sakura (JP); Kazuhiko Aikawa, Sakura (JP); Kuniharu Himeno, Sakura (JP); Ning Guan, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/154,731

(22) Filed: Jun. 17, 2005

(65) Prior Publication Data
US 2006/0051034 A1   Mar. 9, 2006

(30) Foreign Application Priority Data
Jun. 22, 2004   (JP)   ............. P2004-183639

(51) Int. Cl.
*G02B 6/255*   (2006.01)
(52) U.S. Cl. .......................... 385/96; 385/97
(58) Field of Classification Search ............ 385/95–99
See application file for complete search history.

(56) References Cited

U.S. PATENT DOCUMENTS

| 6,652,163 B2 * | 11/2003 | Fajardo et al. ............. 385/96 |
| 2006/0067632 A1 * | 3/2006 | Broeng et al. ............. 385/96 |

FOREIGN PATENT DOCUMENTS

| JP | 2002-40278 A | 2/2002 |
| JP | 2002-148468 A | 5/2002 |
| JP | 2002-243972 A | 8/2002 |
| JP | 2003-14973 A | 1/2003 |
| JP | 2004-077890 A | 3/2004 |
| JP | 2004-177804 A | 6/2004 |
| JP | 2005-10250 A | 1/2005 |
| WO | WO 03/038496 A1 | 5/2003 |

OTHER PUBLICATIONS

Kumagai, et al., A study on splice of Photonic Crystal Fiber and Conventional Single Mode Fiber, 2004 IEICE Plenary Meeting Proceedings, Mar. 8, 2004, p. 317, C-3-143.
Yoshida, et al., "Observation of huge Fresnel reflection at splicing points between a photonic crystal fiber and a conventional fiber and their suppression method", 2003 IEICE Plenary Meeting Proceedings, Mar. 3, 2003, p. 229, Electronics 1, C-3-89.
Hachiwaka, et al., "A study on fusion splice of photonic crystal fiber", 2002 IEICE Electronics Society, Plenary Meeting Proceedings I, Aug. 20, 2002, p. 149, C-3-49.

* cited by examiner

*Primary Examiner*—Hemang Sanghavi
(74) *Attorney, Agent, or Firm*—Sughrue Mion, PLLC

(57) ABSTRACT

A connection method for a photonic crystal fiber for connecting the photonic crystal fiber and a fiber to be connected, the photonic crystal fiber including a cladding region having a number of microholes and a core region having a same refractive index as that of the cladding region, includes the steps of: abutting respective end faces of the photonic crystal fiber and the fiber to be connected each other; after the abutting, performing a main discharge in which an abutted portion is heated by an electric discharge under a first condition; and after the main discharge, performing an additional discharge in which the connection portion is heated by an electric discharge at least once under a second condition to increase a splice strength.

14 Claims, 1 Drawing Sheet

CONNECTION METHOD AND CONNECTING STRUCTURE FOR PHOTONIC CRYSTAL FIBER

BACKGROUND OF THE INVENTION

1. Field of the Invention

The present invention relates to a connection method and a connecting structure for connecting a photonic crystal fiber and an optical fiber of a different type or two photonic crystal fibers with low loss.

Priority is claimed on Japanese Patent Application No. 2004-183639, filed Jun. 22, 2004, the content of which is incorporated herein by reference.

2. Description of Related Art

A photonic crystal fiber is an optical fiber that has microholes in the cladding region thereof and is capable of exhibiting characteristics that cannot be achieved with a conventional optical fiber having a core/cladding structure. Such photonic crystal fibers have been developed as promising functional fiber of various types or transmission fiber for the future. Since a cladding region of a photonic crystal fiber has a number of microholes, the cladding region equivalently has a lower refractive index than that of the core region and totally reflects light coming from pure silica of the core region, thereby making the light propagate through the core region. By changing the design of the arrangement of microholes, it is possible to obtain various characteristics.

In order to use such photonic crystal fibers as transmission fibers or fibers employed in various optical components, it is required to connect a photonic crystal fiber and an optical fiber of a different type or two photonic crystal fibers with low loss.

Conventionally, as a method for connecting a photonic crystal fiber and an optical fiber of a different type or two photonic crystal fibers with low loss, a technique disclosed in Japanese Unexamined Patent Application, First Publication No. 2002-243972 has been proposed.

In addition, as a method for improving the connection strength between photonic crystal fibers, a technique disclosed in Japanese Unexamined Patent Application, First Publication No. 2004-77890 has been proposed.

A photonic crystal fiber has a core region formed from silica glass that has the same refractive index as that of a cladding region, and the cladding region has a number of microholes. When such a photonic crystal fiber and an optical fiber of a different type or two photonic crystal fibers are fusion-spliced, if a number of microholes in the cladding region collapse upon splicing, the collapsed portion becomes silica glass portion having a uniform refractive index profile in which the wave-guiding structure is destroyed, resulting in an increase in the splice loss. In order to reduce the splice loss, it is required to connect fibers while preserving the microhole structure so that the wave-guiding structure is not destroyed. For preserving the microhole structure so that the wave-guiding structure is not destroyed, the heating time and the heating temperature must be minimized. However, reducing the time and the temperature for heating a fusion-spliced portion leads to the insufficient fusion, resulting in reduced splice strength.

In the connection method disclosed in Japanese Unexamined Patent Application, First Publication No. 2002-243972, a fusion is performed by sealing microholes of a photonic crystal fiber. When the microholes are sealing of, the sealed portion has the same structure as that of a fiber to be connected, which helps to achieve significant reduction in the splice loss. In addition, since the mode field diameter of the connecting end portion of the photonic crystal fiber is enlarged, it is possible to reduce the splice loss by connecting the photonic crystal fiber to a fiber having a large mode field diameter. However, when this connection method is used for connection of a photonic crystal fiber that includes a core region having the same refractive index as that of a cladding region, in the portion in which microholes collapse, the core and the cladding are fused as a single body in which the wave-guiding structure is destroyed. For this reason, this connection method cannot be used for achieving a fusion splice of a photonic crystal fiber that includes a core region having the same refractive index as that of a cladding region with low loss.

In the connection method disclosed in Japanese Unexamined Patent Application, First Publication No. 2004-77890, in order to prevent microholes of photonic crystal fiber from being collapsed upon fusion splicing, the spacing between fiber end faces are reduced to minimize the effect of the heat to fiber end faces, thereby preventing the microholes from collapsing. It is possible to reduce the heat applied to the fiber end face using this method, and Japanese Unexamined Patent Application, First Publication No. 2004-77890 teaches that a strong fiber connecting structure can be obtained by pressing the fiber to a predetermined length. However, the improvement in the splice strength achievable by this connection method is insufficient.

SUMMARY OF THE INVENTION

The present invention was conceived in view of the above-mentioned background, and an object thereof is to provide a connection method for connecting a photonic crystal fiber that includes a core region having the same refractive index as that of a cladding region and has a number of microholes in the cladding region and a fiber to be connected, i.e., a fiber of a different type or another photonic crystal fiber, with low loss and high splice strength.

In order to achieve the above-described object, the present invention provides a connection method for a photonic crystal fiber for connecting the photonic crystal fiber and a fiber to be connected, the photonic crystal fiber including a cladding region having a number of microholes and a core region having a same refractive index as that of the cladding region, including the steps of: abutting respective end faces of the photonic crystal fiber and the fiber to be connected each other; after the abutting, performing a main discharge in which an abutted portion is heated by an electric discharge under a first condition; and after the main discharge, performing an additional discharge in which the connection portion is heated by an electric discharge at least once under a second condition to increase a splice strength.

In the connection method according to the present invention, a discharge duration in the main discharge is preferably 500 msec or shorter.

In the connection method according to the present invention, the additional discharge is preferably an intermittent discharge in which the electric discharge is turned on and off repeatedly in a cycle of a short time.

In the connection method according to the present invention, an ON duration of a single ON in the intermittent discharge is preferably shorter than a discharge duration in the main discharge.

In the connection method according to the present invention, an OFF duration of a single OFF in the intermittent discharge is preferably one half to twice of the ON duration.

In the connection method according to the present invention, the total discharge duration of the intermittent discharge is preferably equal to or longer than a total duration of all of the ON duration and the OFF duration.

In addition, the present invention provides connecting structure for a photonic crystal fiber including: a fusion-spliced portion that is formed using the connection method for a photonic crystal fiber according to the above-described present invention having uncollapsed microholes.

In the connecting structure of the present invention, a splice loss in the fusion-spliced portion is 0.4 dB or lower and a splice strength is preferably 0.5 kgf or higher.

According to the present invention, for connecting a photonic crystal fiber including a cladding region having a number of microholes and a core region having a same refractive index as that of the cladding region and a fiber to be connected, respective end faces of the photonic crystal fiber and the fiber to be connected are abutted each other. Then, a main discharge is performed in which the abutted portion is heated by the electric discharge under a heating condition such that microholes in the photonic crystal fiber do not collapse. Thereafter, an additional discharge is performed in which the connection portion is heated by the electric discharge at least once under a condition such that the microholes in the photonic crystal fiber do not collapse to improve the splice strength to form a fusion-spliced portion. This enables formation of a fusion splice while preserving the microhole structure of the end portion of the photonic crystal fiber, and it is possible to form the fusion-spliced portion that exhibits low loss and sufficiently improved connection strength.

In addition, since the fusion splice is performed in a series of steps using a fusion splicing apparatus, it is possible to easily connect a photonic crystal fiber and a fiber to be connected with low loss and a high splice strength.

DETAILED DESCRIPTION OF THE INVENTION

Hereafter, various embodiments of the present invention will be described with reference to the drawings.

Figure 1:
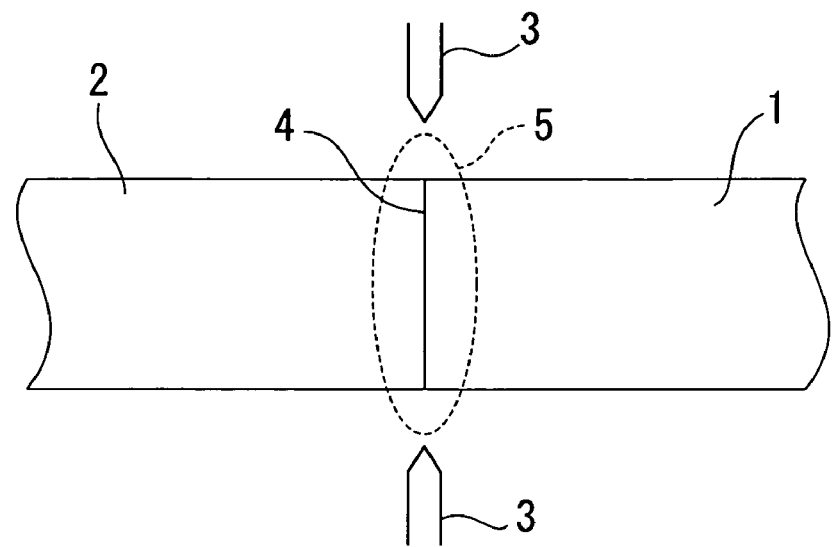
FIG. 1 is a side view of fusion-spliced portion according to an embodiment of the present invention.

FIG. 1 is a side view illustrating the principal portion of an embodiment of the present invention. In this figure, reference numeral 1 refers to a photonic crystal fiber, reference numeral 2 refers to a fiber to be connected, reference numerals 3 refer to electrodes of a fusion splicing apparatus, reference numeral 4 refers to a fusion-spliced portion, and reference numeral 5 refers to electric discharge.

Figure 2:
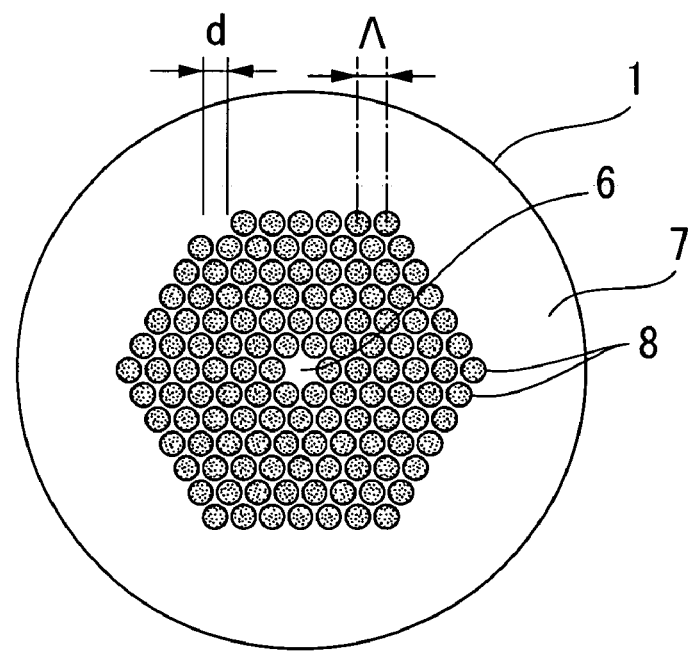
FIG. 2 is a diagram illustrating an end face of an example of photonic crystal fiber used in the present invention.

As shown in FIG. 2, this photonic crystal fiber 1 includes a core region 6 having the same refractive index as that of a cladding region 7 and has a number of microholes 8 in the cladding region 7. In this illustration, the photonic crystal fiber 1 is formed from silica glass, and a number of microholes 8 surround the core region 6, defining a plurality of layers. The diameter "d" of the microholes 8 and the microhole pitch $\Lambda$ may be constant or may be varied. It should be noted that the photonic crystal fiber used in the present invention may not be limited to the photonic crystal fiber 1 shown in FIG. 2, and that various photonic crystal fibers having a different microhole arrangement structure may be used.

The fiber 2 to be connected may be a fiber of a type different from the photonic crystal fiber 1, or may be a fiber of the same type as the photonic crystal fiber 1. A different fiber may be, for example, a silica-based single-mode fiber (hereinafter, referred to as an "SMF"), a multimode fiber, or the like.

For fusion splicing the photonic crystal fiber 1 and the fiber 2 to be connected using the connection method according to the present invention, fiber end portions of the two fibers are set in the fusion splicing apparatus. The fibers are each set so that the end faces of the respective fibers are abutted each other in the space between the electrodes 3 of the fusion splicing apparatus. This abutted portion is to be heated by the electric discharge 5 generated between the electrodes 3 when the fusion splicing apparatus is engaged.

Then, a main discharge is performed in which an abutted portion is heated by the electric discharge under the heating condition such that the microholes 8 of the photonic crystal fiber 1 do not collapse. It is desirable that the heating condition for this main discharge includes the discharge duration of 500 msec or shorter such that a splice loss at the fusion-spliced portion 4 of 0.4 dB or lower and a splice strength of 0.5 kgf or less are achieved. In a conventional fusion splice method, if the splice strength is 0.5 kgf or less, the fusion-spliced portion is often broken in the proof mode of a fusion splicing apparatus. In the connection method according to the present invention, an additional discharge is performed following the main discharge in order to enhance the splice strength. For this reason, although the main discharge cannot provide reliability, the splice strength of 0.5 kgf or less achieved by the main discharge is suffice. On the other hand, if the splice strength achieved by the main discharge is greater than 0.5 kgf, the microholes 8 of the photonic crystal fiber 1 may collapse and the splice loss may be increased.

After the main discharge, an additional discharge for improving the splice strength is performed in which the fusion-spliced portion 4 is heated by the electric discharge at least once to form the fusion-spliced portion 4 under the heating condition such that the microholes 8 of the photonic crystal fiber 1 do not collapse.

This additional discharge is preferably an intermittent discharge in which the electric discharge is turned on and off repeatedly in a cycle of a short time. By performing the intermittent discharge in which electric discharge is repeatedly generated for a short time period following the main discharge, the microhole portion of the photonic crystal fiber 1 is prevented from getting hot, thereby preventing collapse of the microholes 8. In this intermittent discharge, when the electric discharge is turned on, the region without microholes that is located outside the microholes 8 inside the cladding region 7 melts first. The electric discharge is turned off before the microholes 8 start to collapse. Since a fusion splice is formed while preserving the microhole structure of the end portion of the photonic-crystal fiber 1 by repeating the above-described procedure, it is possible to form the fusion-spliced portion 4 that exhibits low loss and a high splice strength.

The ON duration of a single ON in the intermittent discharge is preferably shorter than a discharge duration in the main discharge. If the ON duration of a single ON in the intermittent discharge is longer than the discharge duration in the main discharge, the microholes 8 may collapse during the intermittent discharge and splice loss may be increased.

In addition, the OFF duration of a single OFF in the intermittent discharge is preferably one half to twice of the ON duration. If the OFF duration is shorter than one half of the ON duration, an increase in the temperature of the fiber microhole portion cannot be suppressed to a sufficient level and the microholes 8 may collapse. On the other hand, the OFF duration is longer than twice of the ON duration, the cladding region outside the microholes is not heated sufficiently and the splice strength cannot be desirably increased.

Furthermore, the total discharge duration of the intermittent discharge is preferably equal to or longer than the total duration of all of the ON duration and the OFF duration. If the total discharge duration of the intermittent discharge is shorter than the total duration of all of the ON duration and the OFF duration, the splice strength cannot be improved to a sufficient level.

By performing the main discharge and the intermittent discharge (additional discharge) as described above, it is possible to form the fusion-spliced portion 4 that exhibits low loss and a high splice strength, and a connecting structure that connects the photonic crystal fiber 1 and the fiber 2 to be connected with low loss and a high splice strength can be obtained. In this fusion-spliced portion 4, the wave-guiding structure is preserved without collapse of the microholes 8 of the photonic crystal fiber 1.

In the connecting structure of the present invention, it is preferable that splice loss at the fusion-spliced portion 4 is 0.4 dB or lower and the splice strength is 0.5 kgf or higher.

EXAMPLE

Example 1

A fusion splice was formed between a photonic crystal fiber having a number of microholes in the cladding region thereof (with a cladding diameter of 125 µm, a microhole diameter "d" of 4.5 µm, a microhole pitch Λ of 7.5 µm, the number of layers of microholes of 5) and an SMF having a cladding diameter of 125 µm and a mode field diameter at a wavelength of 1550 nm of 10 µm. As a fusion splicing apparatus, FSM-40F fusion splicing apparatus manufactured by Fujikura, Ltd. was used.

The fibers were each placed in the fusion splicing apparatus and the end faces of the respective fibers were set so that they were abutted each other. Connection portions were formed by performing the main discharge by varying the discharge durations while fixing the power of the main discharge to 0 bit, and the splice losses of thus formed connection portions were measured. The results are listed in Table 1.

TABLE 1

| Discharge Duration msec | Splice Loss db | Splice Strength kgf |
|---|---|---|
| 300 | 0.25 | 0.3 |
| 400 | 0.40 | 0.5 |
| 500 | 0.75 | 0.7 |
| 700 | 1.65 | 1.0 |

Measurements were taken at a wavelength of 1550 nm

The results in Table 1 indicate that splice loss decreased as the discharge duration became shorter since microholes in the photonic crystal fiber were preserved when the discharge duration was shorter.

When the discharge duration was 500 msec or longer, splice loss increased due to collapse of the microholes.

When the discharge duration was shorter than 300 msec, the discharge duration was too short to splice the fibers.

A discharge duration of 300 msec gave the smallest splice loss, and the average breaking strength of the fusion spliced portion formed in this condition was determined to be small with 0.30 kgf. The proof level of the fusion splicing apparatus employed was 0.2 kgf, and some of the samples formed with a discharge duration 300 msec were broken in the proof mode of the fusion splicing apparatus.

Example 2

Fusion-spliced portions were formed by performing an intermittent discharge as an additional discharge after a main discharge. In the main discharge, a discharge duration of 300 msec that had been determined as the condition that gave the smallest low loss in the above-described Example 1 was used. The splice losses and the splice strengths of the thus obtained fusion-spliced portions were measured. In the intermittent discharge, the fusion splice was perfumed by setting the discharge power to the same discharge power as in the main discharge, the ON duration to 300 msec, which is the same as in the main discharge, and the OFF duration to between 100 and 700 msec. The total discharge duration of the intermittent discharge was such that the discharge was turned on and off twice. The results of the measurement of the splice losses and the splice strengths of the fusion-spliced portions are listed in Table 2.

TABLE 2

| Main | Intermittent Discharge | | | | |
|---|---|---|---|---|---|
| Discharge Duration msec | ON Duration msec | OFF Duration msec | Total Duration msec | Splice Loss dB | Splice Strength kgf |
| 300 | 0 | 0 | 0 | 0.25 | 0.30 |
| 300 | 300 | 100 | 800 | 0.80 | 1.45 |
| 300 | 300 | 150 | 900 | 0.40 | 1.40 |
| 300 | 300 | 200 | 1000 | 0.26 | 1.40 |
| 300 | 300 | 450 | 1500 | 0.32 | 0.80 |
| 300 | 300 | 600 | 1800 | 0.31 | 0.60 |
| 300 | 300 | 700 | 2000 | 0.32 | 0.47 |

Measurements were taken at a wavelength of 1550 nm

The results in Table 2 indicate that performing the intermittent discharge following the main discharge can improve the splice strength while suppressing the splice loss to a low level. When the OFF duration of the intermittent discharge was short, microholes collapsed, resulting in an increase in the splice loss. The splice strength could not be increased when the OFF duration is longer.

Example 3

Photonic crystal fibers of the same type as those used in Example 1 were fusion spliced in the manner similar to Example 2. The main discharge duration was changed to 350 msec, the intermittent discharge duration was set such that the ON duration was the discharge duration of 300 msec with the discharge power and the OFF duration was between 100 and 700 msec. The total discharge duration of the intermittent discharge was set such that the discharge was turned on and off twice. The results of the measurement of the splice losses and the splice strengths of the fusion-spliced portions are listed in Table 3.

TABLE 3

| Main Discharge Duration msec | Intermittent Discharge | | | Splice Loss dB | Splice Strength kgf |
|---|---|---|---|---|---|
| | ON Duration msec | OFF Duration msec | Total Duration msec | | |
| 350 | 0 | 0 | 0 | 0.28 | 0.30 |
| 350 | 300 | 100 | 800 | 0.90 | 1.15 |
| 350 | 300 | 150 | 900 | 0.40 | 1.10 |
| 350 | 300 | 200 | 1000 | 0.30 | 1.00 |
| 350 | 300 | 450 | 1500 | 0.33 | 0.80 |
| 350 | 300 | 600 | 1800 | 0.35 | 0.60 |
| 350 | 300 | 700 | 2000 | 0.34 | 0.43 |

Measurements were taken at a wavelength of 1550 nm

The results in Table 3 indicate that performing the intermittent discharge following the main discharge can improve the splice strength while suppressing the splice loss to a low level when two photonic crystal fibers were spliced. When the OFF duration of the intermittent discharge was short, microholes collapsed, resulting in an increase in the splice loss. The splice strength could not be increased when the OFF duration is longer.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A connection method for connecting a photonic crystal fiber, comprising a cladding region having a number of microholes and a core region having a same refractive index as that of the cladding region, with a second fiber, the method comprising:
   abutting a first end face of the photonic crystal fiber and a first end face of the second fiber;
   after the abutting, performing a main discharge in which the abutted ends are heated by an electric discharge; and
   after the main discharge, performing a second discharge in which the abutted ends are heated by a second electric discharge to increase a connection strength therebetween.

2. The connection method according to claim 1, wherein the main discharge is performed under a first condition; and the second discharge is performed under a second condition different from the first.

3. The connection method according to claim 1, wherein a duration of the main discharge is 500 msec or shorter.

4. The connection method according to claim 1, wherein the second discharge comprises an intermittent discharge in which the electric discharge has an ON duration and an OFF duration.

5. The connection method according to claim 4, wherein the ON duration is shorter than a duration of the main discharge.

6. The connection method according to claim 4, wherein the OFF duration is one half to twice of the ON duration.

7. The connection method according to claim 4, wherein a duration of the second discharge is equal to or longer than a total duration of the ON duration and the OFF duration.

8. The connection method according to claim 1, wherein the second discharge comprises an intermittent discharge in which the electric discharge has a plurality of ON durations and a plurality of OFF durations.

9. The connection method according to claim 8, wherein the ON durations are each shorter than a duration of the main discharge.

10. The connection method according to claim 8, wherein the OFF durations are one half to twice of the respective ON durations.

11. The connection method according to claim 8, wherein a duration of the second discharge is equal to or longer than a total duration of the plurality of ON durations and the plurality of OFF durations.

12. The connecting method according to claim 1, wherein:
   the abutted ends form a fusion-spliced portion;
   a splice loss in the fusion-spliced portion is 0.4 dB or lower; and
   a splice strength in the fusion-spliced portion is 0.5 kgf or higher.

13. The connecting method according to claim 12, wherein the splice loss in the fusion-spliced portion is 0.4 dB or lower in a wavelength band of between 1.25 and 1.65 µm.

14. The connecting method according to claim 1, wherein the main discharge and second discharge are discrete in time.

* * * * *